Aug. 9, 1938.     A. JOHNSON     2,126,470
TENSIONED POWER DRIVE
Filed Nov. 18, 1937     2 Sheets-Sheet 1
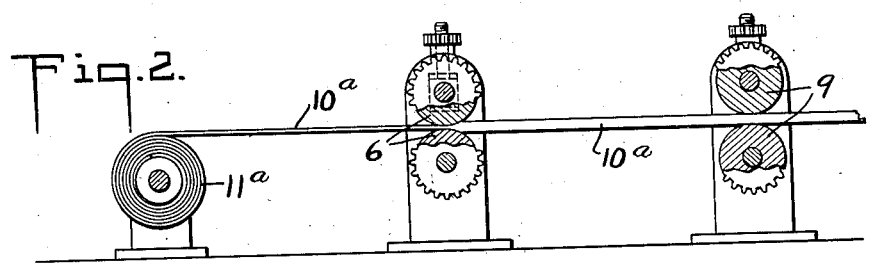
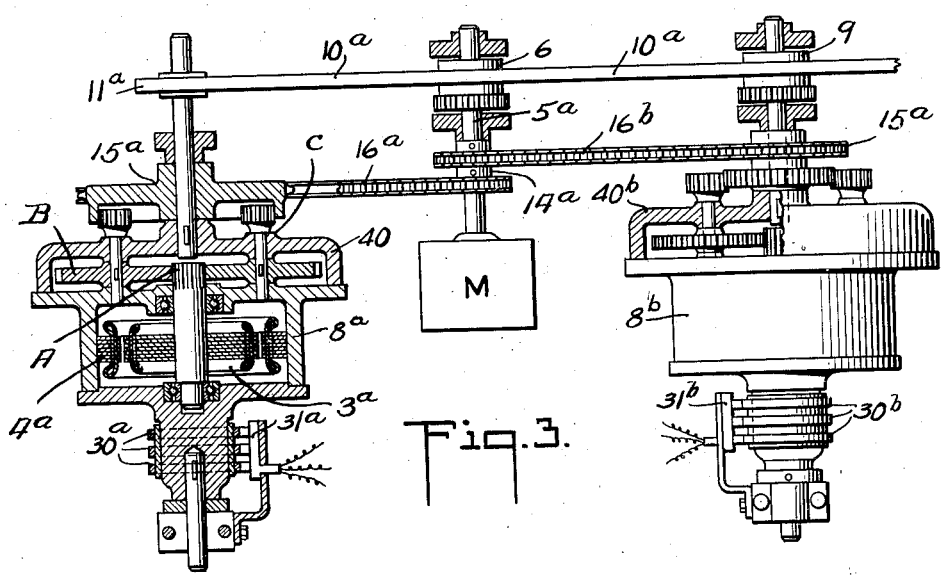
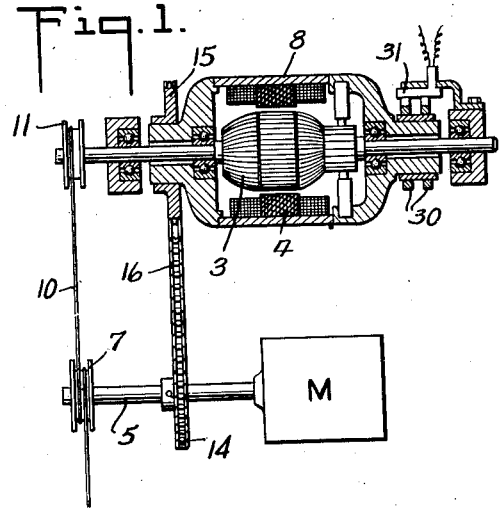
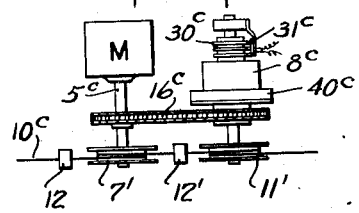
Alfred Johnson
INVENTOR Aug. 9, 1938.    A. JOHNSON    2,126,470
TENSIONED POWER DRIVE
Filed Nov. 18, 1937    2 Sheets-Sheet 2

Alfred Johnson
INVENTOR.

Patented Aug. 9, 1938

2,126,470

UNITED STATES PATENT OFFICE 2,126,470

TENSIONED POWER DRIVE

Alfred Johnson, New York, N. Y.

Application November 18, 1937, Serial No. 175,305
In Great Britain December 12, 1934

11 Claims. (Cl. 242—75)

This invention relates to improvements in and relating to tensioned power drives, and particularly to driving mechanisms wherein a constant operating tension is maintained upon a lineal element, the object of the invention being to provide an improved driving mechanism of the type wherein, in prior art, the linear element has been tensioned by a weight, spring motor or a motor-generator connected torque motor. This application includes matter taken from application Ser. No. 719,727, filed April 9, 1934, and is a continuation in part of my application Ser. No. 60,600, filed January 24, 1936, both applications now being abandoned. Attention is also directed to my application Ser. No. 758,732 filed Dec. 22, 1934 of which the present case is also a continuation in part.

It is the main object of the invention to provide a connection with the parts constructed and arranged so that the linear element to be tensioned is placed out of the line of power transmission, thereby relieving the linear element from transmitting the power required for driving the pulling device.

A further object of the present invention being to provide an immediately acting driving connection between driven mechanism and means co-operating therewith to produce at all times a predetermined drawing, testing, straitening or tensioning force upon an element having lineal continuity, when the driven mechanism is in motion in either direction as well as when it is at rest.

Another object is to produce a tension control which will be especially applicable to continuous operation.

According to the present invention a driving mechanism for immediate carrying over of power, through the constant tensioning effected by a torque motor and the predetermined ratio of the relative motions between the parts, comprises the combination with a linear element and driven mechanism, including a rotatable member, of a driven member operatively connected to the rotatable member and capable of governing the forward feed of the linear element in either direction, and of means cooperating therewith for delivering and applying a tensioning and driving force upon the linear element including a rotatable device adapted to handle said linear element continuously as to retard same or to advance same or wind same; a differential driving connection for connecting the rotatable member in driving relation with the said rotatable device with an electric torque motor connected therewith in such a manner that the torque motor is effective at all times, when energized, to maintain aforesaid linear element under tension, to control the torque factor of the power transferred from the movement of the rotatable member and to cause the rotatable device to be driven by the conjoint driving effort of the torque motor and the said rotatable member, so that power is transmitted by the connections and the linear element relieved from acting as a power transmitting element.

The torque motor of the present invention is not to be confounded with the usual wind up motor that supplies power both to drive the reel and to maintain a tension on the linear element being wound, or with the usual slip clutch where the slip clutch is driven to generate a driving force on the pulling device but is incapable of keeping a tension upon the linear element unless driven. The present motor is of the type usually associated with such apparatus as a potential switch gear where an electric motor is effective for closing the switch and holding the switch closed indefinitely against springs. As disclosed herein later the present motor constitutes a torque clutch provided with positive connections for controlling the turning movement of the torque motor to control the torque of the motor and for operatively connecting the torque motor and the rotatable member of the driven mechanism in driving relation with the pulling device so that the linear element is placed outside the line of power transmission. On the one hand, the connections may be arranged so as to be automatically effective to limit the relative movement of the motor parts to a minimum when a fixed torque is to be applied to the pulling device, and on the other hand, when a predetermined change in the magnitude of the torque to be applied to the pulling device is desired, as when the driven mechanism is operated in both directions, then the connections are arranged so as to subject the torque motor to a slow reverse movement, when the driven means for receiving the lineal element is taking up the lineal element, to increase the torque of the torque motor in accordance with the torque speed characteristics of the torque motor, and so as to allow the torque motor a slow forward movement when the pulling device or said driven means is paying out the lineal element to decrease the torque, thereby causing the torque motor to deliver a torque upon the pulling device that varies in accordance with the direction of motion. The slowing down and reversal of the torque motor is automatically effected by the connections and by the change in the diameter of the wound body when the pulling device is a reel, or its equivalent, as the dimensions of the reel can of course be made such that the torque speed value required for driving the reel, to maintain a certain fixed tension on the lineal element, equals the torque speed characteristics of a torque motor having suitable resistance and reactance.

Referring to the drawings in which like reference characters denote similar parts in all the figures:

Figure 1 is a view illustrating my invention as employed in a driving connection for a pulling device.

Figure 2 is a view illustrating my inventions as employed in an arrangement for tensioning a strip.

Figure 3 is a plan of the arrangement shown in Figure 2.

Figure 4 is a diagrammatic view illustrating my invention in a drive of the type in which an element having lineal continuity is being operated upon and pulled through a plurality of devices, like diameter reducing dies.

Figure 7:
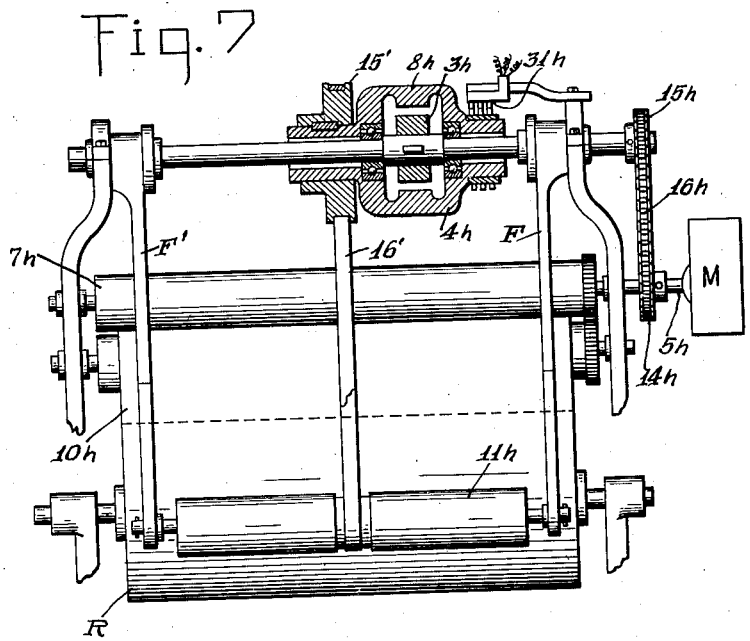
Figure 7 is a view showing how the driving connection may be applied for checking the movement of a take off reel to provide tension upon material in web, sheet, strand or strip form.

I will now proceed to describe Figure 1. In this figure the reference character 10, designates an element being fed, in the present instance, by a positively driven capstan 7, after which it is taken up by a pulling device 11. The pulling device 11 draws or pulls the element 10 from the capstan 7, with a uniform effort or tension. An electric torque motor having a rotatable field structure 4 and a rotatable rotor 3 is designated as a whole by the numeral 8. The reference character M designates a driven mechanism or machine, and a rotatable member 5 constitutes a movable part or driven member of said driven mechanism. In this application of the invention, the rotatable member 5 also serves to drive the capstan 7. The two part electric motor 8, has one part operatively connected to the rotatable member 5, as by the sprockets 14 and 15 and the belt 16. The other part of the motor 8, is connected to the take up reel 11 in such a manner as to drive the rotatable device or receiving means 11 or to rotate therewith. In order to lead a source of electric current into the windings of the motor 8, collector slip rings 30 may be provided upon which bear the brushes 31.

Figure 5:
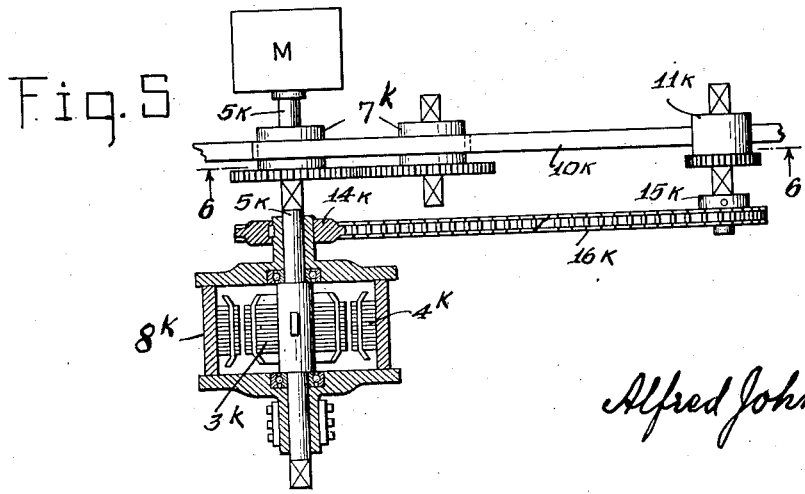
Figure 5 is a view illustrating how the drive may be used for causing a linear element to frictionally engage capstans.

Referring now to Figures 2 and 3 and also Figure 5 of the drawings which show how my invention may be applied to stretching or drawing a portion of a strip while said strip is operated upon by a driven mechanism and positively advanced as by rolls. The pulling devices are each driven by differential driving connections similar to that described in Fig. 1, the only difference being that the one set of pulling devices now acts on the ingoing portion of the strip to retard same while the other set of pulling devices draws or pulls the outgoing portion of the linear element from the feed rolls. In this way, when the torque motors are suitably geared, components of force are made possible that may be any desired value for the forming of resultants which may be readily raised to, and maintained in proximity to the ultimate rupturing tension of the strip or strand. The present arrangement makes for efficient operation, because the force applied to the ingoing portion of the lineal element is partly balanced by the force applied to the outgoing portion, thereby obviating loss of power in the testing or drawing operation. While I have illustrated two co-operating driving connections in Figs. 2 and 3 it is to be understood that one driving connection is capable of acting alone, but two driving connections are used when it is desired to relieve the feed rolls or forwarding means for the linear element from acting as a pulling device.

Referring now more particularly to Figures 2 and 3, the reference character M, designates a driven mechanism or machine. A rotatable member $5^a$ is an element of the machine M and is connected in driving relation with the rolls 6. An element $10^a$ passes between the rolls 6 in such a manner that the rolls 6 tend to advance the element. The reel $11^a$ draws or pulls the element $10^a$, from the rolls 6, with a substantially uniform tension or effort. The reel $11^a$ is driven from the rotatable member $5^a$ by a driving connection having a torque motor $8^a$ having a rotatable rotor $3^a$ and a rotatable field structure or frame member $4^a$ and similar to the one described in Figure 1; the only difference being that the torque motor is, in the present instance, provided with a train of gearing 40. The intermediate compounded gears B and C connect the motor pinion A with the gear $15^a$, so that they operatively connect the motor rotor and frame member with the reel $11^a$, as by shafting. The driving member $15^a$ is rotatably supported as on shafting and positively connected to the rotatable member $5^a$, as by the driving member $14^a$ and the transmission member $16^a$. The rolls 9 restrain or retard the lineal element $10^a$ with a certain fixed effort or tension when the driven mechanism M is at rest as well as while it is in motion. The torque motor $8^b$ is in the present instance excited for rotation so that the rolls 9, connected with the motor $8^b$, tend to retard the element $10^a$. When continuous operation is desired, the reel $11^a$ may be replaced as a pulling device by rolls similar to the rolls 9.

In Fig. 4, a further embodiment of the invention, the reference characters 7' and 11', designate two capstans which provide the traction for the wire $10^c$ being operated upon. The stands for the drawing dies are designated 12 and 12'. The source of power is designated $5^c$, and in the present instance the rotatable member $5^c$ drives the capstan 7'. A geared electric torque motor, similar to the one illustrated in Figures 2 and 3, has one rotatable electro-magnetic element connected to the capstan 11'. The other electro-magnetic element of the motor $8^c$ is connected to the rotatable member $5^c$, as by the belt $16^c$. As in the heretofore described forms of the invention, the motor $8^c$, controls the torque factor of the power communicated to the reel or capstan 11' from the movement of the rotatable member $5^c$.

Figure 6:
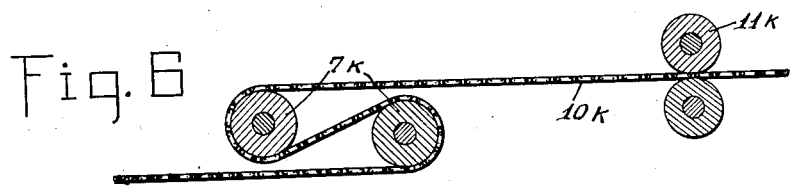
Figure 6 is a section taken on line 6—6 of the drawing in Figure 5.

In the Figures 5 and 6 of the drawings, means or capstans $7^k$ for governing the forward feed of the linear element $10^k$ and the rolls or driven means $11^k$ for exerting a pull to cause pressure engagement of the linear element with the capstans are, like the forwarding means and the reel shown in Fig. 3, connected to the power transmitting devices M and the shaft $5^k$ and driven from said shaft so that the motion of rotation communicated from said shaft tends to advance the linear element. The Fig. 5 shows a torque motor $8^k$ having a rotatable rotor $3^k$ and a rotatable frame member $4^k$, differentially connected, as by the driving means or train of mechanism $14^k$, $15^k$ and $16^k$, to the capstans $7^k$ and to the rolls $11^k$, so that the motor's rotor and frame member are caused to have similar motion and substantially the same speeds, thereby enabling the motor to maintain a certain fixed tension upon the linear element regardless of the speed or the direction of movement of the capstans.

It is to be understood that the present drive is applicable in many other embodiments to tension material in web, sheet, strand and strip form. For example, Fig. 7, shows the drive employed in connection with a take off reel to tension a lineal body and check the rotation of a running roll. A roll $11^h$ is rotatably supported, as on swingable arms F and F' to bear against the periphery of a web roll R, so that the roll or friction means $11^h$ frictionally engages the roll R. The lineal element $10^h$ of the roll R, is positively advanced as by the rolls or forwarding means $7^h$, driven by a rotatable member $5^h$ of the power transmitting devices or machine M. A transmission member $16'$ operatively connects the roll $11^h$ with the driving member $15'$. The driving member $15'$ is attached to the rotatable frame member $4^h$ of the torque motor $8^h$. The motor rotor $3^h$ now preferably being driven by the rotatable member $5^h$, through the intermediary of motion mechanism $14^h$ and $15^h$ having such ratios, that the torque exerted by the torque motor is least when the web roll is running at full speed and so that the torque of the motor $8^h$ is increased when the roll R is stopping, that is to say, the torque motor is caused to exert compensating driving of the roll $11^h$, when the machine M is running at full speed; the rotor $3^h$ being driven by the rotatable member $5^h$ at a slightly greater speed than the motor frame $4^h$, thereby reducing the torque of the motor $8^h$.

Again referring to the Fig. 7, and assuming that the driving member $14^h$ has such a ratio with reference to the other parts of the train of mechanism that, when the rolls $7^h$ are running at full speed, the co-operating rotor $3^h$ and field member $4^h$ have similar motion and the same speeds, then with this arrangement, the torque motor is effective, through the intermediary of the rotatable roll $11^h$, for holding the roll R against unwinding with a force that is the same while said roll is in motion as well as while it is stationary, and the rate of motion of rotation the torque motor is called upon to add or subtract is, at all times, substantially zero. But a slight decrease in the force checking the roll R seems desirable and an increase in the diameter of the driving member $14^h$ will drive the rotor $3^h$ at a greater rate of speed relative the frame member $4^h$ and effect a decrease in the torque of the torque motor in accordance with the increase in the speed. Thus in an arrangement of the type illustrated in the Fig. 7, the value of the torque developed by the torque motor and applied to the roll $11^h$ can of course have zero or any suitable value during full running speed.

The only difference between the arrangements shown in the different figures being that the driving connection is adapted for the work to be done. Thus the Figure 3 illustrates a differential connection wherein the torque motor is provided with a gear effective for enabling the torque motor to maintain a high substantially constant tension, while in the Figures 1 and 5, when less tension is required, the conventional torque clutch is shown instead. In each instance a tensioned driving connection is provided between the driven mechanism and the torque motor; with driving means adapted to control the rotation of the torque motor to control the torque of the torque motor to vary the intensity of the tensioning force automatically, so that the tensioning force is maintained constant regardless of the speed or the direction of motion, or, when desired, is varied so that the pulling device applies an increased tensioning force on the linear element, when the pulling device acts as a leading tensioning device and automatically is operated to effect a decrease in the tensioning force applied upon reversal of the driven mechanism, when the pulling device acts as a retarding device for the lineal element.

It is to be understood that this invention is not limited to the type of connections and equipment illustrated. Such connections and equipment are to be considered as merely schematic and illustrative of manners of connecting a torque clutch differentially to drive a pulling device for a lineal element, conjointly with driven mechanism, so, that the lineal element is placed outside the line of power transmission. For example, a synchronous torque set may be used instead of the belt illustrated, when the position of the pulling device is located at a distance from the driven mechanism. Basically the set consists, as is well known, of two identical synchrotie units electrically connected, one of which is for convenience, called the transmitter and the other the receiver, and forming the driving and driven members of a connection for connecting for example two shafts.

What is claimed is:—

1. The combination with driven mechanism, including a rotatable member and a capstan for frictionally engaging a linear element to advance said linear element, of a pulling device adapted to propel said linear element; an electric torque motor, having a rotatable rotor and a rotatable frame member, adapted, when energized, for rotating the pulling device to maintain continuous tension upon the linear element regardless of the movement of the said rotatable member to effect pressure engagement of the linear element with the capstan; a source of electric current for the torque motor and connections whereby the torque motor is differentially connected to said pulling device and said rotatable member, including driving and driven members effective, when said rotatable member is in motion, for automatically controlling the speed and the direction of rotation of the torque motor to control the torque of the torque motor.

2. The combination with driven mechanism capable of governing the forward feed of an element having linear continuity through a mill and the like, including a rotatable member; of means cooperating therewith to produce a high substantially constant pull upon the outgoing portion of the element, said means including a rotatable device adapted to propel said element, an electric torque motor having a rotatable rotor and a rotatable frame member, adapted, when energized, for rotating said rotatable device to maintain continuous tension upon said element regardless of the movement of the said driven mechanism, a gear connecting said rotor and said frame member, a source of electric current for the torque motor and connections for differentially connecting the torque motor with said rotatable device and said rotatable member, including driving and driven members effective, when said driven mechanism is in motion, for controlling the speed and the direction of motion of the said rotor with reference to the frame member to control the torque of the torque motor, and enable said torque motor through the intermediary of the said gear to cause a high substantially constant tension to be applied to the linear element.

3. The combination with driven mechanism capable of governing the forward feed of an element having linear continuity through a mill and the like, including a rotatable member; means cooperating therewith to produce a high substantially constant pull upon the outgoing portion of the element; means for retarding the ingoing portion of the element; each of said means including a rotatable device adapted to propel said element; a geared electric torque motor having relatively rotatable rotor and field structures one of which is connected to the rotatable device and the other of which is mechanically driven by the rotatable member; a source of electric current for the torque motor and connections effective, when said driven mechanism is in motion, for maintaining the ratios between the speeds of the rotor and the field structure, to cause said rotor and said field structure to have similar motion and the same speeds, thereby enabling the torque motor, when energized, to maintain the torque factor of the power transferred to the said rotatable device constant.

4. The combination with driven mechanism capable of governing the forward feed of a linear element, including a rotatable member; of a rotatable device adapted to propel the linear element; an electric torque motor having a rotatable rotor and a rotatable frame member; a gear operatively connecting said rotor and said frame member with the rotatable device and whereby the torque motor works with mechanical advantage; a source of electric current for the torque motor and connections for effecting transmission of power to the rotatable device from the movement of the rotatable member and by the torque motor, including driving and driven members effective for automatically varying the speed ratios of rotation of the rotor and the frame member to vary the torque of the torque motor.

5. In a tensioned driving connection, the combination with a traveling lineal element, a rotatable member and a forwarding means for said element connected thereto, of a driven means for receiving said element, an electric torque motor, having a rotatable rotor and a rotatable frame member; driving means whereby the torque motor is differentially connected to said driven means and to said rotatable member, means for energizing said torque motor to cause the torque motor to tension the element between said forwarding means and said driven means, and means for driving the rotatable member and the said forwarding means whereby when said rotatable member is driven it will drive said driven means through the connections.

6. The combination with a rotatable member, means for forwarding a travelling lineal element connected to said rotatable member, means for receiving said element and an electric torque motor having a rotatable field member and a rotatable armature member, of driving means connecting one of said members to said rotatable member and driving means connecting the other of said members to said receiving means, means for energizing said torque motor to cause the torque motor to tension the element between said receiving means and said forwarding means, and means for driving said rotatable member, said forwarding means and, through the connections with the torque motor, said receiving means to thereby communicate power to said receiving means in proportion to the work required for driving said receiving means.

7. In a drive, the combination with a shaft to be driven and a driven member capable of governing the forward feed of a linear element connecting, through the intermediary of means adapted to propel same, said shaft and said driven member; connections to said driven member; power transmitting devices including a rotatable member operating through said connections for driving said driven member; an electric torque motor having a rotatable rotor and a rotatable field member, adapted, for maintaining, through the intermediary of said means, continuous tension upon the linear element regardless of the movement of the said driven member, and a train of mechanism for inter-connecting said rotatable member, said torque motor and the said shaft, effective, when said rotatable member is in motion, for controlling the speed and the direction of rotation of the said rotor with reference to said field member to control the torque of the torque motor.

8. The combination with reversible driven mechanism, including a forwarding means for a linear element; of a driven means adapted to propel the element; a train of mechanism and a torque motor having a rotatable rotor and a rotatable frame member one of which is, through the intermediary of the train of mechanism, connected with said forwarding means and the other of which is connected to said driven means, said train of mechanism defining means for causing said rotor and the said frame member to have similar motion and substantially the same speeds, thereby enabling the torque motor to maintain a certain fixed tension upon said linear element regardless of the speed or the direction of motion of the forwarding means.

9. In a driving connection for a take up reel, driven mechanism capable of governing the forward feed of a linear element, including a rotatable member, a driven means for receiving said element; an electric torque motor having a rotatable rotor and a rotatable frame member one of which is connected to said rotatable member and the other of which is operatively connected to said driven means; means for energizing said torque motor to cause the torque motor to apply continuous torque to said driven means to thereby tension said element, and driving means for differentially connecting said electric torque motor to said driven means and to said rotatable member, effective, when said rotatable member is in motion, for causing said rotatable member to drive said driven means through said driving means.

10. The combination with a take off reel for a lineal element and a forwarding means for said element; of a friction means for engaging the element on the reel, a torque motor having a rotatable rotor and a rotatable frame member operatively connected to said friction means; means for energizing said torque motor to cause the torque motor to apply continuous torque to said friction means to tension said element; means for driving said forwarding means; including a rotatable member; and driving means for differentially connecting said torque motor to said friction means and to said rotatable member, effective, when said rotatable member is in motion, for causing said rotatable member to drive said friction means through the connections, including a train of mechanism effective for automatically varying the speed of the torque motor an amount depending upon the amount of increase in the speed of said rotatable member to effect a decrease in the torque of the torque motor to thereby effect a reduction in the torque upon the said friction means while said rotatable member is running at full speed.

11. The combination with a driven means adapted to propel a lineal element; a means capable of governing the forward feed of said element and means for driving said last mentioned means, including a rotatable member; of a torque motor having a rotatable rotor part and a rotatable field part with one of said parts operatively connected to said driven means, means for energizing said torque motor to cause the torque motor to apply a continuous torque to said driven means to thereby tension said element; and connections for connecting the other of the aforesaid parts to said rotatable member to thereby enable the rotatable member to drive said driven means through the connections, including driving and driven members effective, when said rotatable member is in motion, for constrainedly governing the rotation of the part connected to said rotatable member; a gear operatively connecting the said parts effective for amplifying the torque delivered by the torque motor to cause a high tension to be applied to the lineal element.

ALFRED JOHNSON.